US010789270B2

(12) United States Patent
Wu

(10) Patent No.: US 10,789,270 B2
(45) Date of Patent: Sep. 29, 2020

(54) BLOCKCHAIN BASED DATA PROCESSING METHOD AND DEVICE

(71) Applicant: Alibaba Group Holding Limited, George Town (KY)

(72) Inventor: Hao Wu, Chengdu (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 257 days.

(21) Appl. No.: 16/034,094

(22) Filed: Jul. 12, 2018

(65) Prior Publication Data

US 2019/0018862 A1 Jan. 17, 2019

(30) Foreign Application Priority Data

Jul. 14, 2017 (CN) .......................... 2017 1 0574373

(51) Int. Cl.
H04L 29/06 (2006.01)
G06F 16/27 (2019.01)
H04L 9/06 (2006.01)

(52) U.S. Cl.
CPC ............ G06F 16/27 (2019.01); H04L 9/0643 (2013.01); H04L 2209/38 (2013.01)

(58) Field of Classification Search
None
See application file for complete search history.

(56) References Cited

U.S. PATENT DOCUMENTS 9,183,214 B2 11/2015 Liu
9,569,771 B2 2/2017 Lesavich et al.
(Continued)

FOREIGN PATENT DOCUMENTS

CN 105740440 7/2016
CN 106383754 2/2017
(Continued)

OTHER PUBLICATIONS

Datta et al., "The Dataindex: A structure for smaller, faster data warehouses," ACM SIGMIS Database: the Database for Advances in Information Systems, 1998, 29(4):33-44.
(Continued)

Primary Examiner — Shin-Hon (Eric) Chen
(74) Attorney, Agent, or Firm — Fish & Richardson P.C.

(57) ABSTRACT

Example methods, non-transitory computer-readable medium, and systems for blockchain-based data processing are provided herein. In one example method, a blockchain network is identified, where the blockchain network includes a plurality of blocks. For each particular block of the plurality of blocks, a series of operations can be performed. An identifier of the particular block and an identifier of service data stored in the particular block are determined. A first mapping relationship is established between the determined identifier of the particular block and the determined identifier of the service data stored in the particular block. That first mapping relationship for the particular block is then stored in a relational database. In some instances, determining the identifier of the block includes obtaining digest information of the block, computing a value based on the digest information of the block, and associating the computed value as the identifier of the particular block.

12 Claims, 7 Drawing Sheets

(56) References Cited

U.S. PATENT DOCUMENTS

| | | |
|---|---|---|
| 2013/0007008 A1 | 1/2013 | Yuan et al. |
| 2014/0149457 A1 | 5/2014 | Liu |
| 2015/0006486 A1 | 1/2015 | Lin et al. |
| 2015/0143475 A1 | 5/2015 | Song et al. |
| 2016/0239527 A1 | 8/2016 | Jang et al. |
| 2016/0247188 A1 | 8/2016 | Zhou |
| 2016/0275603 A1 | 9/2016 | Su |
| 2016/0292672 A1 | 10/2016 | Fay et al. |
| 2016/0321745 A1 | 11/2016 | Zhang et al. |
| 2017/0031874 A1 | 2/2017 | Boudville |
| 2017/0131988 A1* | 5/2017 | Boudville ............... G06F 16/95 |
| 2017/0132615 A1 | 5/2017 | Castinado et al. |
| 2017/0324711 A1 | 11/2017 | Feeney et al. |
| 2018/0121620 A1 | 5/2018 | Bastide et al. |
| 2020/0050595 A1* | 2/2020 | Sun ....................... H04L 9/3239 |
| 2020/0050613 A1* | 2/2020 | Gauvreau, Jr. ......... G06F 21/60 |
| 2020/0051074 A1* | 2/2020 | Suh .................... G06Q 20/4018 |
| 2020/0133957 A1 | 4/2020 | Wu |

FOREIGN PATENT DOCUMENTS

| | | |
|---|---|---|
| CN | 106445993 | 2/2017 |
| CN | 106682984 | 5/2017 |
| CN | 106874393 | 6/2017 |
| CN | 106899680 | 6/2017 |
| EP | 3531316 | 8/2019 |
| EP | 3531650 | 8/2019 |
| EP | 3547240 | 10/2019 |
| TW | M542178 | 5/2017 |
| TW | M543413 | 6/2017 |

OTHER PUBLICATIONS

International Search Report and Written Opinion in International Application No. PCT/US2018/042084, dated Oct. 2, 2018, 22 pages.

McConaghy et al., "BigchainDB: a scalable blockchain database," White Paper, BigchanDB, 2016, 66 pages.

Snow et al., Factom White Paper [online], "Factom White Paper 1.0—Factom—Business Processes Secured by Immutable Audit Trails on the Blockchain," Nov. 2014, [retrieved on Jun. 14, 2017], retrieved from: URL<https://www.factom.com/devs/docs/guide/factom-white-paper-1-0>, 38 pages.

International Preliminary Report on Patentability in International Application No. PCT/US2018/042084, dated Oct. 9, 2019, 24 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

| hash | Block identifier |
|---|---|
| pre_hash | Identifier of a pervious block |
| version | Version number |
| height | Height of a block in the entire chain |
| timestamp | Generation time of the block |
| tx_root_hash | State value of the block |

FIG. 2

| | |
|---|---|
| hash | Identifier of service data |
| version | Data version number of service data |
| type | Service type |
| pubkey | Public key of an initiator |
| timestamp | Initiation time |
| signature | Digital signature of the initiator |
| payload | Data content |
| tx_status | Storage status |
| block | Identifier of a storage block |

FIG. 3

| block_hash | Identifier of a block |
| --- | --- |
| tx_root_hash | State value of the block |
| tx_hash_list | Identifier of service data stored in the block |

FIG. 4

BLOCKCHAIN BASED DATA PROCESSING METHOD AND DEVICE

CROSS-REFERENCE TO RELATED APPLICATIONS

This application claims priority to Chinese Patent Application No. 201710574373.3, filed on Jul. 14, 2017, which is hereby incorporated by reference in its entirety.

TECHNICAL FIELD

The present application relates to the fields of Internet information processing technologies and computer technologies, and in particular, to a blockchain based data processing method and device.

BACKGROUND

The blockchain technology, also referred to as the distributed ledger technology, is a distributed Internet database technology characterized by decentralization, transparency, tamper-resistance, and trust.

Data storage is an important function of the blockchain technology. Each block includes a data header and a data body. The data header is used to establish a chain relationship with another block, that is, implement a chain connection between different blocks. The data body is used to store service data.

For example, a data header of the nth block includes digest information of the nth block and digest information of the (n−1)th block. A chain relationship between the nth block and the (n−1)th block is established based on the digest information of the (n−1)th block.

Service data stored is usually stored in a data body of each block in a key-value form. For example, assume that the service data is "user A transfers $100 to user B at time T". If the service data is stored in the block, a transaction time (time T), a transaction source address (an address corresponding to user A), a transaction destination address (an address corresponding to user B), and a transaction amount ($100) can be stored in the block. Here, the transaction time, the transaction source address, the transaction destination address, and the transaction amount can be referred to as keys. The time T, the address corresponding to user A, the address corresponding to user B, and $100 can be referred to as values (attributes) corresponding to different keys.

SUMMARY

In view of the above, the implementations of the present application provide a blockchain based data processing method and device to enhance transaction processing capabilities such as data analysis and data computation in a blockchain network.

The following technical solutions are used in the implementations of the present application:

An implementation of the present application provides a blockchain based data processing method, including the following: determining an identifier of each block in a blockchain network; determining an identifier of service data stored in each block; establishing a mapping relationship between the identifier of the block and the identifier of the service data stored in the block for each block; and storing the mapping relationship in a relational database.

An implementation of the present application further provides a blockchain based data processing device, including the following: a determining unit, configured to determine an identifier of each block in a blockchain network and determine an identifier of service data stored in each block; and a processing unit, configured to establish a mapping relationship between the identifier of the block and the identifier of the service data stored in the block for each block and store the mapping relationship in a relational database.

An implementation of the present application further provides a blockchain based data processing device, including one or more memories and one or more processors. The memory stores a program, and at least one of the processors is configured to perform the following steps: determining an identifier of each block in a blockchain network; determining an identifier of service data stored in each block; establishing a mapping relationship between the identifier of the block and the identifier of the service data stored in the block for each block; and storing the mapping relationship in a relational database.

One or more of the technical solutions used in the implementations of the present application can achieve the following beneficial effects:

In the solutions provided in the implementations of the present application, the identifier of the block in the blockchain network and the identifier of the service data stored in the block are determined. The mapping relationship between the identifier of the block and the identifier of the service data stored in the block is established for each block; the mapping relationship is stored in the relational database. As such, service data stored in the blockchain network is converted from non-relational data to relational data. The relational data is stored in the relational database, so the reliability of data storage in the blockchain network can be improved, the transaction processing capabilities, such as data analysis and data computation in the blockchain network, can be enhanced, and a system capability of the blockchain network can be enhanced.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings:

FIG. 2 is a diagram illustrating an example of a table structure corresponding to a block data table, according to an implementation of the present application;

FIG. 3 is a diagram illustrating an example of a table structure corresponding to a service data table, according to an implementation of the present application;

FIG. 4 is a diagram illustrating an example of a table structure corresponding to a relational database, according to an implementation of the present application;

DESCRIPTION OF EMBODIMENTS

Data is stored in a key-value form in a blockchain network. Although it can be ensured that service data is not tampered with, reliability of data storage is relatively low, and it is not conducive to perform transaction processing, such as data analysis and data computation, in the blockchain network.

A transaction in a database is a logical unit running in the database, and it is atomic, consistent, isolated, and durable. It can effectively ensure a data processing capability in the database. The processing capability here includes an analysis capability, a computation capability, a query capability, etc.

In view of the above, the implementations of the present application provide a blockchain based data processing method and device to enhance transaction processing capabilities, such as data analysis and data computation, in a blockchain network.

To make the objectives, technical solutions, and advantages of the present application clearer, the following describes the technical solutions of the present application with reference to specific implementations of the present application and corresponding accompanying drawings. Apparently, the described implementations are merely some rather than all of the implementations of the present application. Other implementations obtained by a person of ordinary skill in the art based on the implementations of the present application without creative efforts shall fall within the protection scope of the present application.

The technical solutions provided by the implementations of the present application are described in detail below with reference to the accompanying drawings.

Figure 1:
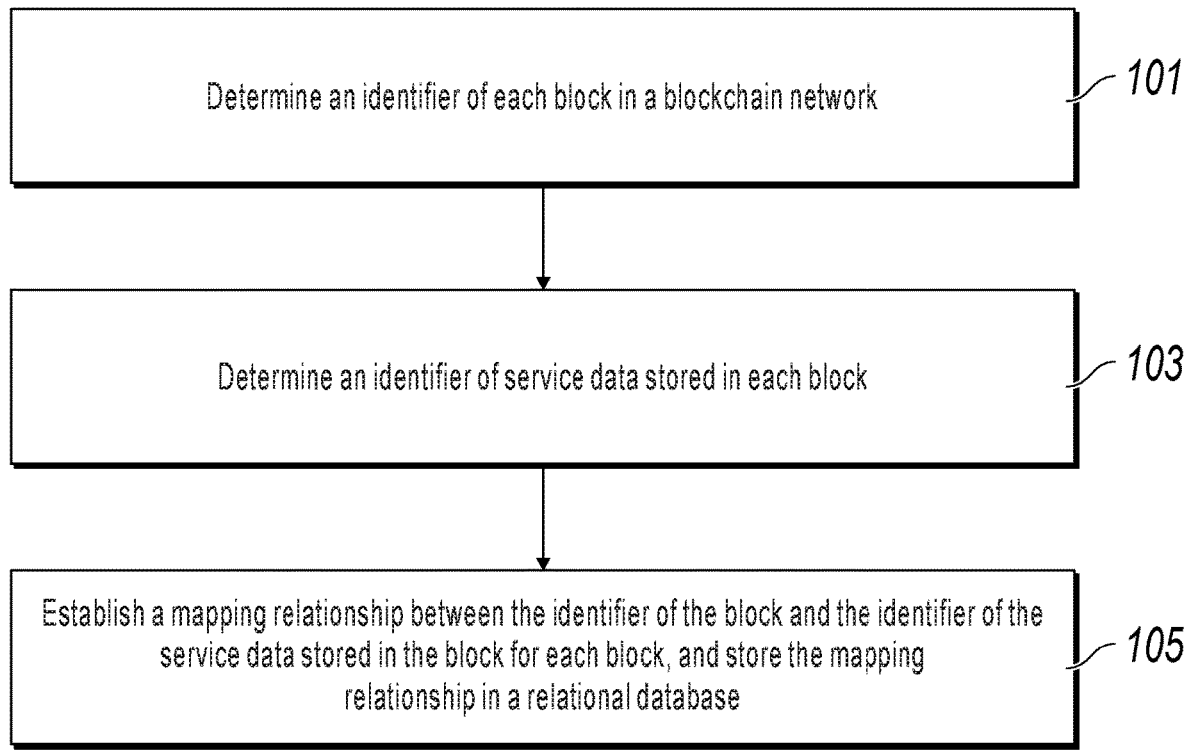
FIG. 1 is a flowchart illustrating an example of a blockchain based data processing method, according to an implementation of the present application.

FIG. 1 is a flowchart illustrating an example of a blockchain based data processing method, according to an implementation of the present application. The method can be described as follows. This implementation of the present application can be performed by a blockchain node or can be performed by a server corresponding to a relational database. No limitation is imposed here.

Step 101: Determine an identifier of each block in a blockchain network.

In this implementation of the present application, each block in the blockchain network can be a newly generated block. When an identifier of such a block is determined, the service data may or may not have been stored in the block. Alternatively, the block can be a block generated earlier, and the service data has been stored in such a block. No limitation is imposed here.

The following step is performed for each block in the blockchain network: obtaining the identifier of the block based on digest information of the block.

It is worthwhile to note that the digest information of the block can include, but is not limited to, a difficulty value (a difficulty goal of a mathematical problem), a nonce (a value that records the answer to the mathematical problem), etc.

After the digest information of the block is obtained, the digest information can be computed by using a specified algorithm, and a computation result is determined as the identifier of the block.

The specified algorithm here can be a hash algorithm or a SHA256 algorithm. No limitation is imposed here.

It is worthwhile to note that the block identifier described in this implementation of the present application can uniquely identify the block, that is, different block identifiers correspond to different blocks.

In this implementation of the present application, the method further includes obtaining a state value of the block based on the service data stored in the block. Here, the state value of the block can be obtained based on a Bucket tree.

First, a Merkle tree is constructed, and the service data stored in the block is considered a leaf node of the Merkle tree. Second, a hash value of each leaf node (the service data) is determined. Finally, computation is performed to obtain a hash value of a root node of the Merkle tree. The obtained hash value of the root node of the Merkle tree is determined as the state value of the block.

In this implementation of the present application, the method further includes the following: establishing a first mapping relationship among the identifier of the block, the state value, and an identifier of a previous block after the state value of the block is obtained and storing the first mapping relationship in a block data table.

FIG. 2 is a diagram illustrating an example of a table structure corresponding to a block data table, according to an implementation of the present application.

It can be seen from FIG. 2 that, in addition to the identifier of the block, the state value, and the identifier of the previous block, the block data table can store a version number of the block, a generation time of the block, and a height value of the block (the height value can be understood as a height of the block in the entire blockchain, that is, a location of the block in the entire blockchain can be determined based on the height value). As such, attribute information of each block in the blockchain network can be quickly obtained by using the block data table.

Step 103: Determine an identifier of service data stored in each block.

In this implementation of the present application, the following step is performed for the service data stored in the block: determining the identifier of the service data based on a hash value of the service data.

The hash value of the service data can be obtained by performing hash computation on a character string corresponding to the service data so that the identifier of the service data can be the hash value.

It is worthwhile to note that the data identifier described in this implementation of the present application can uniquely identify the service data, provided that information for uniquely identifying the service data can be used as the identifier of the service data. No limitation is imposed here.

In this implementation of the present application, the method further includes establishing a second mapping relationship between the identifier of the service data and the identifier of the block with the service data after the identifier of the service data is obtained and storing the second mapping relationship in a service data table.

FIG. 3 is a diagram illustrating an example of a table structure corresponding to a service data table, according to an implementation of the present application.

It can be seen from FIG. 3 that, in addition to the identifier of the service data and the identifier of the block with the service data, the service data table can store a version number of the service data, a service type of the service data, a public key of an initiator in the service data, an initiation time of the service data, a digital signature (signed with a private key by the initiator) in the service data, data content of the service data, a storage status of the service data (that is, whether the service data is stored in the block), etc.

It is worthwhile to note that the service data described in step 103 can be service data that has been stored in the block or can be service data that has not been stored in the block. Before the service data is stored in the block, the service data can be stored in the service data table. In this case, the storage status of the service data in the service data table can be that the service data is not stored in the block.

If the service data has been stored in the block, when the service data is stored in the service data table, the storage status of the service data can be that the service data has been stored in the block.

It is worthwhile to note that "first" and "second" included in the "first mapping relationship" and "second mapping relationship" described in this implementation of the present application have no special meanings and merely represent different mapping relationships.

Step 105: Establish a mapping relationship between the identifier of the block and the identifier of the service data stored in the block for each block and store the mapping relationship in a relational database.

In this implementation of the present application, if the state value of the block is obtained in step 101, a mapping relationship among the identifier of the block, the state value, and the identifier of the service data stored in the block can be further established, and the mapping relationship is stored in the relational database.

FIG. 4 is a diagram illustrating an example of a table structure corresponding to a relational database, according to an implementation of the present application.

It can be seen from FIG. 4 that the table structure corresponding to the relational database includes the identifier of the block, the state value of the block, and the identifier of the service data stored in the block. The identifier of the service data stored in the block can be a data identifier set or a data identifier list. No limitation is imposed here.

In this implementation of the present application, the mapping relationship between the identifier of the block and the identifier of the service data stored in the block can be further established by using the following method: establishing a mapping relationship between the identifier of the block and the identifier of the service data stored in the block based on the first mapping relationship included in the block data table and the second mapping relationship included in the service data table.

For example, the established block data table is shown in Table 1:

TABLE 1

| Identifier of a block | Identifier of a previous block | Height value | State value |
|---|---|---|---|
| 6XeQRg6Ajw3rTA ZddefitnmfpAKA6 NspnLhm8byuvJXM | | 45 | DFhhweYK1JJrHMU4k LvcCuQi5KnV6DRmH QWajw6LdjQ4 |
| 5Gj5aYzepjcU3gPb Fhh9VVcx9jMvsAe P2oCvzKZ4LC4B | 6XeQRg6Ajw3rTAZ ddefitnmfpAKA6Ns pnLhm8byuvJXM | 46 | 2UXwzSNVPHxfNop6 v3JNigs2DZg7ZiTucPv 1mLBfVpUk |

The established service data table is shown in Table 2:

TABLE 2

| Identifier of service data | Status | Identifier of a storage block |
|---|---|---|
| BXMEuqJfnhC7no8n5EPXPUzyiL w21YWxAMqW6fAMpxid | Chained | 6XeQRg6Ajw3rTAZddefitn mfpAKA6NspnLhm8byuvJXM |
| DnTg93xxdYiE88iRxkXrpUGfQe mtL1uHs422J6RUizF1 | Chained | 5Gj5aYzepjcU3gPbFhh9VV cx9jMvsAeP2oCvzKZ4LC4B |
| DkukkEqW4iirM7waHuRh258PCp Yd54QwLL8v1ATjGSP6 | Chained | 5Gj5aYzepjcU3gPbFhh9VV cx9jMvsAeP2oCvzKZ4LC4B |

It can be determined by analyzing Table 1 and Table 2 that the service data whose identifier is BXMEuqffnhC7no8n5EPXPUzyiLw21YWxA MqW6fAMpxid is stored in a block whose identifier is 6XeQRg6Ajw3rTAZddefitnmfpAKA6NspnLhm8byuv JXM; the service data whose identifier is DnTg93xxdYiE88iRxkXrpUGfQemtL1uHs422J6RUizF1 and the service data whose identifier is DkukkEqW4iirM7waHuRh258PCpYd54QwLL8v1 ATjGSP6 are stored in a block whose identifier is 5Gj5aYzepjcU3gPbFhh9VVcx9jMvsAeP2oCvzKZ4LC4B.

Based on the block identifier, the mapping relationship between the identifier of the block and the identifier of the service data stored in the block is shown in Table 3:

TABLE 3

| Identifier of a block | State value | Identifier of service data |
| --- | --- | --- |
| 6XeQRg6Ajw3rTAZ ddefitnmfpAKA6Nsp nLhm8byuvJXM | DFhhweYK1JJrH MU4kLvcCuQi5K nV6DRmHQWaj w6LdjQ4 | BXMEuqffnhC7no8n5EPXPUzyiLw 21YWxAMqW6fAMpxid |
| 5Gj5aYzepjcU3gPbF hh9VVcx9jMvsAeP2 oCvzKZ4LC4B | 2UXwzSNVPHxf Nop6v3JNigs2DZ g7ZiTucPv1mLBf VpUk | DnTg93xxdYiE88iRxkXrpUGfQemt L1uHs422J6RUizF1 DkukkEqW4iirM7waHuRh258PCpY d54QwLL8v1ATjGSP6 |

In this implementation of the present application, when a new block or new service data is generated, the block data table, the service data table, and the relational database can be synchronously updated.

An identifier of a newly generated block is determined when the new block is generated; and the block data table and/or the relational database are/is synchronously updated based on the identifier of the newly generated block.

In another implementation of the present application, the method further includes the following: determining an identifier of newly generated service data when the new service data is generated; establishing a mapping relationship between the identifier of the newly generated service data and an identifier of a block with the new service data once the new service data is stored in the block; and synchronously updating the service data table and/or the relational database based on the mapping relationship.

For example, when new service data is generated, the service data can be stored in the service data table, and Table 2 can be updated to Table 4:

TABLE 4

| Identifier of service data | Status | Identifier of a storage block |
| --- | --- | --- |
| BXMEuqJfnhC7no8n5EPXPUz yiLw21YWxAMqW6fAMpxid | Chained | 6XeQRg6Ajw3rTAZddefitnmfpA KA6NspnLhm8byuvJXM |
| DnTg93xxdYiE88iRxkXrpUGf QemtL1uHs422J6RUizF1 | Chained | 5Gj5aYzepjcU3gPbFhh9VVcx9j MvsAeP2oCvzKZ4LC4B |
| DkukkEqW4iirM7waHuRh258P CpYd54QwLL8v1ATjGSP6 | Chained | 5Gj5aYzepjcU3gPbFhh9VVcx9j MvsAeP2oCvzKZ4LC4B |
| DJu65XmCsLiS7QPWfLaQpbo Kg2eJZtP6ZYtAsJsSGFjb | Unchained | |

Based on content in Table 4, it can be determined that the service data whose identifier is DJu65XmCsLiS7QPWfLaQpboKg2eJZtP6ZYtAsJsSGFjb has not been stored in the block.

If the service data is stored in the block, the service data in Table 4 is updated to that in Table 5.

TABLE 5

| Identifier of service data | Status | Identifier of a storage block |
| --- | --- | --- |
| BXMEuqJfnhC7no8n5EPXPUzyiLw21YWxAMqW6fAMpxid | Chained | 6XeQRg6Ajw3rTAZddefitnmfpAKA6NspnLhm8byuvJXM |
| DnTg93xxdYiE88iRxkXrpUGfQemtL1uHs422J6RUizF1 | Chained | 5Gj5aYzepjcU3gPbFhh9VVcx9jMvsAeP2oCvzKZ4LC4B |
| DkukkEqW4iirM7waHuRh258PCpYd54QwLL8v1ATjGSP6 | Chained | 5Gj5aYzepjcU3gPbFhh9VVcx9jMvsAeP2oCvzKZ4LC4B |
| DJu65XmCsLiS7QPWfLaQpboKg2eJZtP6ZYtAsJsSGFjb | Chained | 6Un3dbeVx21HfqZwaAZ1DgLnjTFAA7KUokRqg7pkTqcv |

Based on content in Table 5, it can be determined that the service data whose identifier is DJu65XmCsLiS7QPWfLaQpboKg2eJZtP6ZYtAsJsSGFjb is stored in a block whose identifier is 6Un3dbeVx21HfqZwaAZ1DgLnjTFAA7KUokRqg7pkTqcv.

Apparently, if a block whose identifier is 6Un3dbeVx21HfqZwaAZ1DgLnjTFAA7KUokRqg7pkTqcv is a newly generated block, in this implementation of the present application, content in the block data table (Table 1) is further updated to that in Table 6:

TABLE 6

| Identifier of a block | Identifier of a previous block | Height value | State value |
| --- | --- | --- | --- |
| 6XeQRg6Ajw3rTAZddefitnmfpAKA6NspnLhm8byuvJXM | | 45 | DFhhweYK1JJrHMU4kLvcCuQi5KnV6DRmHQWajw6LdjQ4 |
| 5Gj5aYzepjcU3gPbFhh9VVcx9jMvsAeP2oCvzKZ4LC4B | 6XeQRg6Ajw3rTAZddefitnmfpAKA6NspnLhm8byuvJXM | 50 | 2UXwzSNVPHxfNop6v3JNigs2DZg7ZiTucPv1mLBfVpUk |
| 6Un3dbeVx21HfqZwaAZ1DgLnjTFAA7KUokRqg7pkTqcv | 5Gj5aYzepjcU3gPbFhh9VVcx9jMvsAeP2oCvzKZ4LC4B | 51 | A9X13s8XUrccRDdv264LQQychzAAM4w77zzhg8XYnauh |

After the new block and the new service data are generated, the relational database can be further updated by using the previously described method, which is shown in Table 7:

TABLE 7

| Identifier of a block | State value | Identifier of service data |
| --- | --- | --- |
| 6XeQRg6Ajw3rTAZddefitnmfpAKA6NspnLhm8byuvJXM | DFhhweYK1JJrHMU4kLvcCuQi5KnV6DRmHQWajw6LdjQ4 | BXMEuqJfnhC7no8n5EPXPUzyiLw21YWxAMqW6fAMpxid |
| 5Gj5aYzepjcU3gPbFhh9VVcx9jMvsAeP2oCvzKZ4LC4B | 2UXwzSNVPHxfNop6v3JNigs2DZg7ZiTucPv1mLBfVpUk | DnTg93xxdYiE88iRxkXrpUGfQemtL1uHs422J6RUizF1 DkukkEqW4iirM7waHuRh258PCpYd54QwLL8v1ATjGSP6 |
| 6Un3dbeVx21HfqZwaAZ1DgLnjTFAA7KUokRqg7pkTqcv | A9X13s8XUrccRDdv264LQQychzAAM4w77zzhg8XYnauh | DJu65XmCsLiS7QPWfLaQpboKg2eJZtP6ZYtAsJsSGFjb |

When service data stored in the blockchain network is converted from non-relational data to relational data, an index can also be created to facilitate subsequent query or analysis of the service data. For example, a block identifier can be used as an index in the block data table. A data identifier can be used as an index in the service data table. In the relational database, a block identifier can be used as an index, or a data identifier can be used as an index, or both a block identifier and a data identifier can be used as an index. No limitation is imposed here.

In the solution provided in this implementation of the present application, the identifier of the block in the blockchain network and the identifier of the service data stored in the block are determined. The mapping relationship between the identifier of the block and the identifier of the service data stored in the block is established for each block; the mapping relationship is stored in the relational database. As such, the service data stored in the blockchain network is converted from the non-relational data to the relational data. The relational data is stored in the relational database, so the reliability of data storage in the blockchain network can be improved, the transaction processing capabilities, such as data analysis and data computation in the blockchain network, can be enhanced, and a system capability of the blockchain network can be enhanced.

Figure 5:
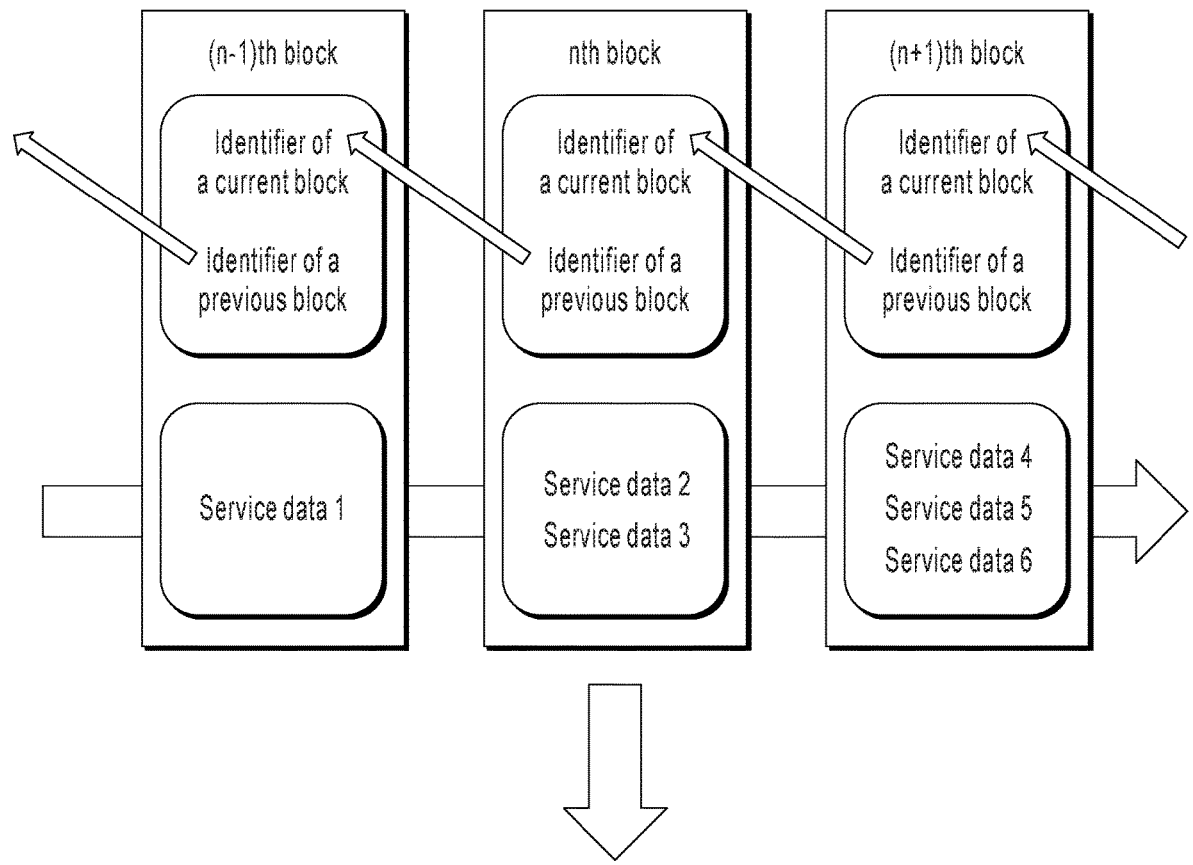
FIG. 5 is a diagram illustrating an example of a scenario of a blockchain based data processing method, according to an implementation of the present application.

FIG. 5 is a diagram illustrating an example of a scenario of a blockchain based data processing method, according to an implementation of the present application.

It can be seen from FIG. 5 that the service data stored in the blockchain network is converted from the non-relational data to the relational data. The relational data is stored in the relational database, so the reliability of data storage in the blockchain network can be improved, the transaction processing capabilities, such as data analysis and data computation in the blockchain network, can be enhanced, and a system capability of the blockchain network can be enhanced.

Figure 6:
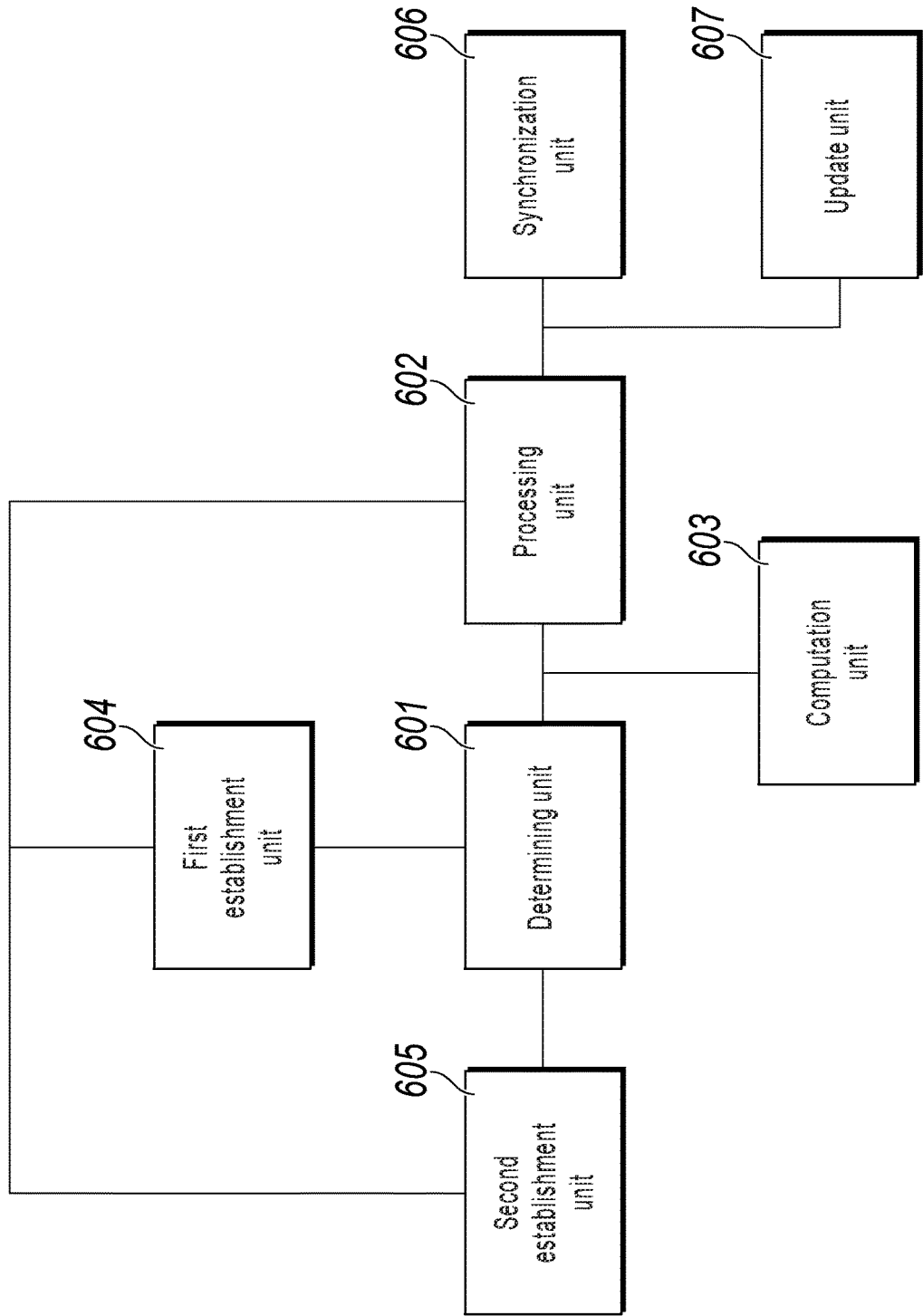
FIG. 6 is a structural diagram illustrating an example of a blockchain based data processing device, according to an implementation of the present application.

FIG. 6 is a structural diagram illustrating an example of a blockchain based data processing device, according to an implementation of the present application. The data processing device includes a determining unit 601 and a processing unit 602.

The determining unit 601 is configured to determine an identifier of each block in a blockchain network and determine an identifier of service data stored in each block.

The processing unit 602 is configured to establish a mapping relationship between the identifier of the block and the identifier of the service data stored in the block for each block and store the mapping relationship in a relational database.

In another implementation of the present application, the determining unit 601 is configured to determine an identifier of each block in a blockchain network, including the following step for each block in the blockchain network: obtaining the identifier of the block based on digest information of the block.

In another implementation of the present application, the data processing device further includes a computation unit 603.

The computation unit 603 is configured to obtain a state value of the block based on the service data stored in the block.

The processing unit 602 is configured to establish a mapping relationship between the identifier of the block and the identifier of the service data stored in the block, including establishing a mapping relationship among the identifier of the block, the state value, and the identifier of the service data stored in the block.

In another implementation of the present application, the data processing device further includes a first establishment unit 604.

The first establishment unit 604 is configured to establish a first mapping relationship among the identifier of the block, the state value, and an identifier of a previous block after the state value of the block is obtained; and store the first mapping relationship in a block data table.

In another implementation of the present application, the determining unit 601 is configured to determine an identifier of service data stored in each block, including the following step for the service data stored in the block: determining the identifier of the service data based on a hash value of the service data.

In another implementation of the present application, the data processing device further includes a second establishment unit 605.

The second establishment unit 605 is configured to establish a second mapping relationship between the identifier of the service data and the identifier of the block with the service data after the identifier of the service data is obtained; and store the second mapping relationship in a service data table.

In another implementation of the present application, the processing unit 602 is configured to establish a mapping relationship between the identifier of the block and the identifier of the service data stored in the block, including establishing a mapping relationship between the identifier of the block and the identifier of the service data stored in the block based on the first mapping relationship included in the block data table and the second mapping relationship included in the service data table.

In another implementation of the present application, the data processing device further includes a synchronization unit 606.

The synchronization unit 606 is configured to determine an identifier of a newly generated block when the new block is generated and synchronously update the block data table and/or the relational database based on the identifier of the newly generated block.

In another implementation of the present application, the data processing device further includes an update unit 607.

The update unit 607 is configured to perform the following steps: determining an identifier of newly generated service data when the new service data is generated; establishing a mapping relationship between the identifier of the newly generated service data and an identifier of a block with the new service data once the new service data is stored in the block; and synchronously updating the service data table and/or the relational database based on the mapping relationship.

It is worthwhile to note that the data processing device provided in this implementation of the present application can be implemented by using software, or it can be implemented by using hardware. No limitation is imposed here. The data processing device converts the service data stored in the blockchain network from non-relational data to relational data and stores the relational data in the relational database. Thus, the reliability of data storage in the blockchain network can be improved, the transaction processing capabilities, such as data analysis and data computation in the blockchain network, can be enhanced, and a system capability of the blockchain network can be enhanced.

Based on a same inventive concept, an implementation of the present application further provides a blockchain based data processing device, including one or more memories and one or more processors. The memory stores a program, and at least one of the processors is configured to perform the following steps: determining an identifier of each block in a blockchain network; determining an identifier of service data stored in each block; and establishing a mapping relationship between the identifier of the block and the identifier of the service data stored in the block for each block and storing the mapping relationship in a relational database.

In this implementation of the present application, the processor can further perform operations based on the solution described in the previous implementation, and details are not described here again.

As such, the implementations of the present application have been described above. Other implementations fall within the scope of the appended claims. In some cases, the actions described in the claims can be performed in a different order and the desired results can still be achieved. In addition, the process depicted in the accompanying drawings is not necessarily shown in a particular order to achieve the desired results. In some implementations, multitask processing and parallel processing can be advantageous.

In the 1990s, it can be apparently identified whether a technology is improved in terms of hardware (for example, a circuit structure of a diode, a transistor, or a switch is improved) or is improved in terms of software (a method procedure is improved). However, as technologies develop, improvements in many current method procedures can be considered a direct improvement in a hardware circuit structure. Almost all designers obtain corresponding hardware circuit structures by programming improved method procedures to hardware circuits. Therefore, it does not mean that the improvement in a method procedure cannot be implemented by using a hardware entity module. For example, a programmable logic device (PLD) such as a field programmable gate array (FPGA) is such an integrated circuit whose logic function is determined by programming a device by a user. Design personnel "integrate" a digital system into a single PLD through programming without requesting a chip manufacturer to design and produce a dedicated integrated circuit chip. In addition, currently, instead of manually producing integrated circuit chips, the programming is mostly implemented by "logic compiler" software, which is similar to a software compiler used for program development and writing. Original code is also written by using a specific programming language, which is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are currently the most commonly used. It should also be clear to a person skilled in the art that a hardware circuit of a logic method procedure can be easily obtained by performing logic programming on the method procedure through several earlier described hardware description languages and programming the method procedure to an integrated circuit.

A controller can be implemented in any appropriate way. For example, the controller can take the form of a microprocessor or a processor and a computer-readable medium storing computer-readable program code (such as software or firmware) that can be executed by the microprocessor or the processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller can also be implemented as a part of control logic of a memory. A person skilled in the art also knows that, in addition to implementing the controller by using the computer-readable program code, logic programming can be performed on method steps to allow the controller to implement the same function in forms of the logic gate, the switch, the programmable logic controller, the programmable logic controller, the embedded microcontroller, etc. Therefore, such a controller can be considered a hardware component. An apparatus included in the controller and configured to implement various functions can be considered a structure in the hardware component. Alternatively, the apparatus configured to implement various functions can even be considered both a software module implementing the method and a structure in the hardware component.

The system, apparatus, module or unit described in the above implementations can be implemented by a computer chip or an entity, or it can be implemented by a product with a certain function. A typical implementation device is a computer. The computer can be, for example, a personal computer, a laptop computer, a cellular phone, a camera phone, an intelligent phone, a personal digital assistant, a media player, a navigation device, an email device, a game console, a tablet computer, a wearable device, or a combination thereof.

For ease of description, the apparatus is described by dividing the functions into various units. Certainly, when the present application is implemented, the functions of all units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product implemented on one or more computer-usable storage media (including, but not limited to, a magnetic disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine so that the instructions executed by a computer or a processor of any other programmable data processing device generate an apparatus for implementing a specified function in one or more processes in the flowcharts and/or in one or more blocks in the block diagrams.

These computer program instructions can be stored in a computer-readable memory that can instruct the computer or any other programmable data processing device to work in a specific way so that the instructions stored in the computer-readable memory generate an artifact that includes an instruction apparatus. The instruction apparatus implements a specified function in one or more processes in the flowcharts and/or in one or more blocks in the block diagrams.

These computer program instructions can be loaded to a computer or another programmable data processing device so that a series of operations and steps are performed on the computer or the another programmable device, thereby generating computer-implemented processing. Therefore, the instructions executed on the computer or another programmable device provide steps for implementing a specified function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that is in a computer-readable medium, for example, a read-only memory (ROM) or a flash memory. The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include, but are not limited to, a parameter random access memory (PRAM), a static RAM (SRAM), a dynamic RAM (DRAM), another type of RAM, a ROM, an electrically erasable programmable ROM (EE-PROM), a flash memory or another memory technology, a compact disc-ROM (CD-ROM), a digital versatile disc (DVD) or another optical storage, a magnetic cassette tape, a magnetic tape disk storage or another magnetic storage device or any other non-transitory medium, which can be used to store information that can be accessed by the computing device. Based on a definition in the present specification, the computer-readable medium does not include computer-readable transitory media (transitory media) such as a modulated data signal and a carrier.

It is worthwhile to note that the term "include", "have", or their any other variant is intended to cover a non-exclusive inclusion so that a process, a method, a commodity, or a device that includes a series of elements not only includes those elements but also includes other elements that are not expressly listed, or further includes elements inherent to such process, method, commodity, or device. An element described by "includes a . . . " further includes, without more constraints, another identical element in the process, method, commodity, or device that includes the element.

The present application can be described in the general context of an executable computer instruction executed by a computer, for example, a program module. Generally, the program module includes a routine, a program, an object, a component, a data structure, etc. for executing a particular task or implementing a particular abstract data type. The present application can also be practiced in distributed computing environments. In the distributed computing environments, tasks are performed by remote processing devices that are connected through a communications network. In a distributed computing environment, the program module can be located in both local and remote computer storage media including storage devices.

The implementations in the present specification are described in a progressive way. For same or similar parts in the implementations, reference can be made to these implementations. Each implementation focuses on a difference from other implementations. Particularly, a system implementation is similar to a method implementation, and therefore, is described briefly. For related parts, reference can be made to partial descriptions in the method implementation.

The previous implementations are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims of the present application.

Figure 7:
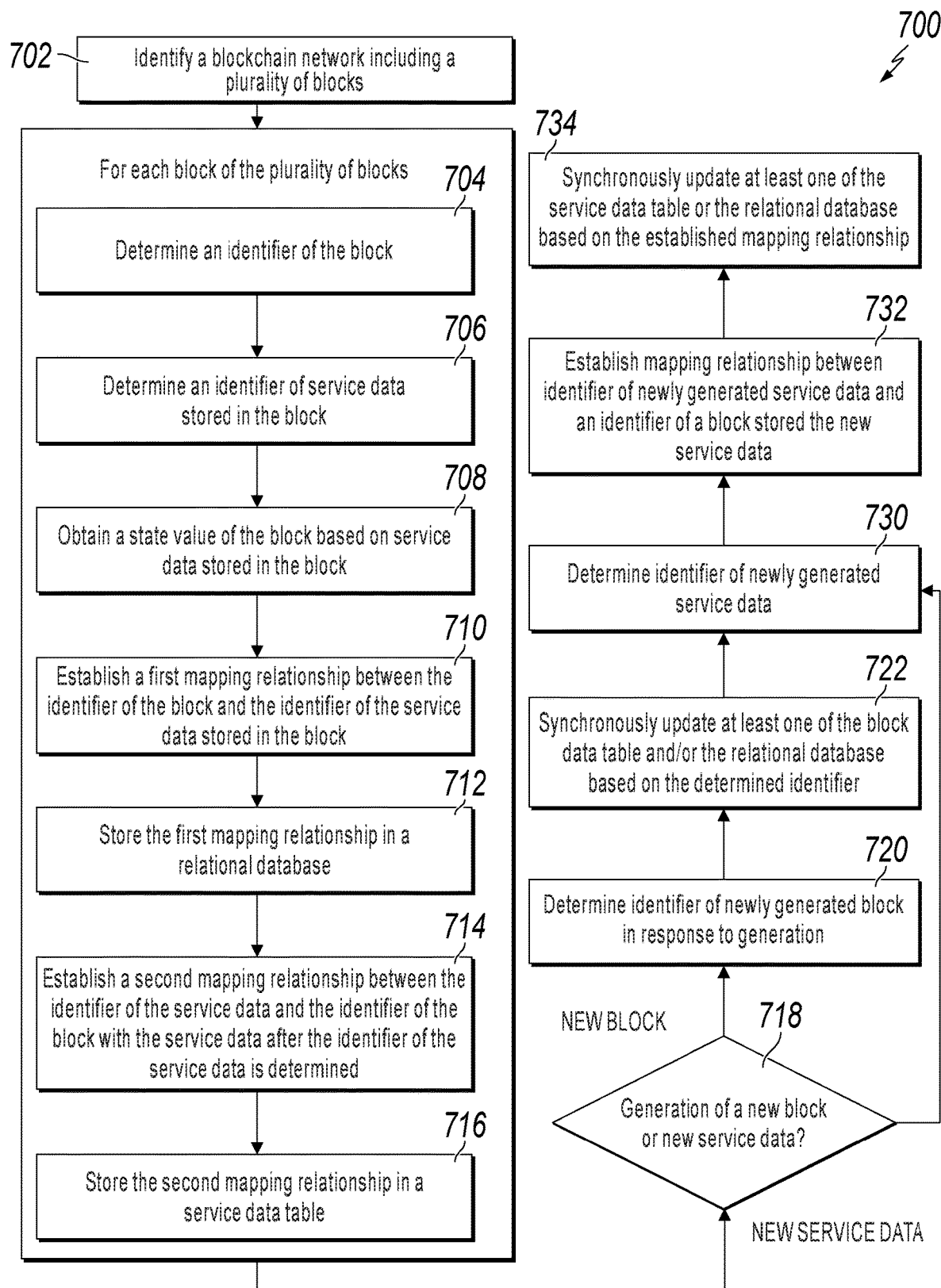
FIG. 7 is a flowchart illustrating an example of a computer-implemented method for blockchain-based data processing, according to an implementation of the present disclosure.

FIG. 7 is a flowchart illustrating an example of a computer-implemented method 700 for blockchain-based data processing, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a blockchain network is identified upon which the present solution is to be applied. The identified blockchain network includes a plurality of blocks in some instances, while a single block may be included in some blockchain networks. Blocks in the blockchain network may be an existing set of blocks, or, in some instances, one or more of the blocks may be newly generated. In some instances, each block may include or store service data. The identification of the blockchain network may be based on an automatic or manual identification, and can be performed by or using any suitable software application, operating system, service, or platform. In performing the solution, each of the blocks of the plurality of blocks are processed according to operations 704-716. From 702, method 700 proceeds to 704.

At 704, an identifier of a particular block is determined. Each particular block may be associated with a specific and unique identifier. In other words, each block in the blockchain network has a different identifier than all other block identifiers.

In some instances, determining the identifier of a particular block is performed by identifying an existing block identifier. In other instances, digest information associated with a particular block can be obtained. The digest information of the block can include, for example, a difficulty value (such as, a difficulty goal of a mathematical problem), a nonce value (such as, a value that records the answer to the mathematical problem), or other information consistent with this disclosure. Using at least a portion of the obtained digest information, an identifier can be generated. For example, a specified algorithm can be used and applied to the at least a portion of the digest information to calculate a corresponding identifier. The computational result of the calculation can be used, in some instances, as the identifier of the particular block. The specified algorithm, for example, may be a hash algorithm or a SHA256 algorithm, among others. From 702, method 700 proceeds to 704.

At 706, an identifier of service data stored in the particular block is determined. In some instances, the particular block may not be associated with or not include service data. In some instances, determining the identifier of the service data can include determining the identifier of the service data based on a hash value of the underlying service data. The hash value of the service data can be obtained by performing a hash computation on a character string corresponding to the service data, with the resulting hash value being used as the identifier of the service data. The service data identifier can uniquely identify the service data in some instances.

The service data can be service data that has been stored in the particular block or can be service data that has not been stored in the block at the present time. Before the service data is stored in the block, the service data can be stored in a service data table. In some instances, the service data table may include a storage status for each service data identifier, where the storage status can identify whether the service data is or is not stored in the particular block. If the service data has been stored in the particular block, then the storage status in the service data table can indicate as such. From 706, method 700 proceeds to 708.

At 708, a state value of the particular block can be obtained based on service data stored in the block. In one example, to obtain the state value of the particular block based on the service data stored in the block, additional operations may be performed. In one example, the state value of the particular block can be obtained based on a bucket tree. First, a Merkle tree can be constructed, and the service data stored in the block can be used as a leaf node of the Merkle tree. Second, a hash value of each leaf node (that is, the service data) is determined. A computation can then be performed to obtain a hash value of a root node of the Merkle tree. The obtained hash value of the root node of the Merkle tree can be used as the state value of the particular block.

While not illustrated in FIG. 7, a mapping relationship between the identifier of the particular block, the state value, and an identifier of a previous block can be established after the state value is obtained, with the mapping relationship being stored in a block data table. FIG. 2, described previously, illustrates an example of a table structure corresponding to a block data table in one implementation. The block data table can include additional information, including some, all, or none of the following: a version number of the particular block, a generation time of the particular block, and a height value of the particular block. The information about each block in the blockchain network can be obtained quickly and efficiently using the block data table.

Returning to FIG. 7, at 710, a first mapping relationship between the identifier of the particular block and the identifier of the service data stored in the block can be established. At 712, the established first mapping relationship can be stored in a relational database. In some instances, where the state value has been obtained at 708, the state value may also be included in the first mapping relationship and also stored in the relational database. As illustrated in FIG. 4, the relational database can store an identifier of the particular block, a state value of the particular block, and an identifier of the service data stored in the block. Further, FIG. 5 illustrates an example scenario of a blockchain-based data processing method that converts the non-relational data of the blockchain network into a relational set of data. From 712, method 700 proceeds to 714.

At 714, a second mapping relationship between the identifier of the service data and the identifier of the particular block with or storing the service data can be established after the identifier of the service data is determined. At 716, the second mapping relationship can be stored in a service data table. FIG. 3 illustrates an example table structure of the service data table in one implementation. In addition to the identifier of the service data and the identifier of the particular block storing the service data, additional information may be included in the service data table, including, but not limited to, some, all, or none of the following: a version number of the service data, a service type of the service data, a public key of an initiator in the service data, an initiation time of the service data, a digital signature (such as, signed with a private key of the initiator) in the service data, data content of the service data, and a storage status of the service data, among others.

In some implementations, a mapping relationship between the identifier of the particular blocks and the identifier of the service data stored in those blocks may be established based on the mapping relationship included in the block data table and the mapping relationship included in the service table data.

Using the described process for each block in the blockchain network, the service data stored in the blockchain network is converted from non-relational data to relational data, as shown in the illustration of FIG. 5. The relational data is stored in the relational database, with which data storage/recovery (for example, data storage/recovery efficiency, security, speed, or accuracy), increased transactional processing capabilities of the blockchain network (for example, data analysis/data computation speed, accuracy, or efficiency), and blockchain network system capabilities (for example, overall computational/data transmission security, efficiency, or speed) can be enhanced.

In some instances, the operations of 702-716 may be performed initially. However, additional new data blocks may be generated for the blockchain network, or new service data may be generated. At 718, a determination is made as to whether a new block or a new service data is generated within the blockchain network. If it is determined that a new block is generated, method 700 proceeds to 720. Otherwise, if it is determined that a new service data is generated, method 700 proceeds to 730. If no new block or new service data is generated, method 700 can wait at 718, or can end.

At 720, in response to determining that a new block is generated, an identifier of the newly generated block is determined. The determination of the identifier may be similar to the determination of 704 in some instances. From 720, method 700 proceeds to 720.

In response to determining the identifier of the newly generated block, at least one of the block data table and the relational database are synchronously updated based on the determined identifier at 722. To update the block data table, a new entry for the newly determined identifier can be inserted, along with an identifier of the previous block in the blockchain network. Additional information, such as the state value of the newly generated block can be added to the block data table, as well as information on a height value of the block. Other suitable information can be included in the block data table. To update the relational database, a new entry in the database can be added related to the newly generated block. In some instances, the newly generated block may be associated with service data, and the identifier of that service data can be included in the database. In other instances, only the block identifier may be added at this time. Once the update is complete, method 700 can end or return to 718.

At 730, an identifier of the newly generated service data is determined. From 730, method 700 proceeds to 732. At

732, a mapping relationship between the determined identifier of the newly generated service data and an identifier of a block storing the new service data is established. At 734, at least one of the service data table or the relational database are synchronously updated based on the established mapping relationship. In some instances, the newly generated service data can be stored in the service data table. However, if the service data is unchained or otherwise is not yet stored in a corresponding block, then only the service data table may be updated. If, or once, the service data is stored in the corresponding block, the service data table is updated accordingly. Using the service data table information, or using information about the service data itself, the relational database can be updated based on the connection between the identifier of the service data and the identifier of the corresponding block.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same.

Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   identifying a particular block from a blockchain network, the blockchain network including a plurality of blocks;
   determining an identifier of the particular block, wherein determining the identifier of the particular block comprises
      obtaining digest information of the particular block,
      computing, using a hash algorithm, a value based on the obtained digest information of the particular block, and
      associating the value computed based on the obtained digest information as the identifier of the particular block;
   determining an identifier of service data stored in the particular block;
   obtaining a state value of the particular block based on the service data stored in the particular block, wherein the state value comprises hash value obtained based on a Bucket tree;
   establishing a first mapping relationship between the determined identifier of the particular block, the obtained state value of the particular block and, the determined identifier of the service data stored in the particular block;
   establishing a second mapping relationship between the identifier of the particular block, the obtained state value of the particular block, and an identifier of a previous block to the particular block after the state value of the particular block is obtained;
   updating a relational database based on the first mapping relationship and the second mapping relationship for the particular block, wherein updating the relational database comprises storing, in a block data table of the relational database, for each particular block, the determined identifier of the particular block, the obtained state value of the particular block, and the determined identifier of the service data stored in the particular block;
   determining an identifier of newly generated service data when the new service data is generated;
   establishing a new mapping relationship between the identifier of the newly generated service data and an identifier of a second particular block storing the new service data after the new service data is stored in the second particular block; and
   updating the relational database based on the new mapping relationship.

2. The computer-implemented method of claim 1, wherein the block data table further stores, for each particular block, at least one of: a version number of the particular block, a generation time of the particular block, or a height value of the particular block.

3. The computer-implemented method of claim 1, wherein the identifier of the service data stored in the particular block comprises a hashed value of the service data.

4. The computer-implemented method of claim 1, wherein the method further comprises, for each particular block of the plurality of blocks:
   establishing a third mapping relationship between the determined identifier of the service data of the particular block and the determined identifier of the particular block with the service data after determining the identifier of the service data; and
   storing the third mapping relationship in a service data table.

5. The computer-implemented method of claim 4, wherein the service data table stores an identifier of the service data and an identifier of the particular block associated with the service data, and at least one of: a version number of the service data, a service type of the service data, a digital signature in the service data, data content of the service data, or a storage status of the service data.

6. The computer-implemented method of claim 1, wherein the method further comprises:
   determining an identifier of a newly generated block when the new block is generated; and
   synchronously updating the relational database based on the determined identifier of the newly generated block.

7. A non-transitory, computer-readable medium storing one or more instructions executable by a computer system to perform operations comprising:
   identifying a particular block from a blockchain network, the blockchain network including a plurality of blocks;
   determining an identifier of the particular block, wherein determining the identifier of the particular block comprises
      obtaining digest information of the particular block,
      computing, using a hash algorithm, a value based on the obtained digest information of the particular block, and
      associating the value computed based on the obtained digest information as the identifier of the particular block;
   determining an identifier of service data stored in the particular block;
   obtaining a state value of the particular block based on the service data stored in the particular block, wherein the state value comprises hash value obtained based on a Bucket tree;

establishing a first mapping relationship between the determined identifier of the particular block, the obtained state value of the particular block and, the determined identifier of the service data stored in the particular block;

establishing a second mapping relationship between the identifier of the particular block, the obtained state value of the particular block, and an identifier of a previous block to the particular block after the state value of the particular block is obtained;

updating a relational database based on the first mapping relationship and the second mapping relationship for the particular block, wherein updating the relational database comprises storing, in a block data table of the relational database, for each particular block, the determined identifier of the particular block, the obtained state value of the particular block, and the determined identifier of the service data stored in the particular block;

determining an identifier of newly generated service data when the new service data is generated;

establishing a new mapping relationship between the identifier of the newly generated service data and an identifier of a second particular block storing the new service data after the new service data is stored in the second particular block; and updating the relational database based on the new mapping relationship.

8. The non-transitory, computer-readable medium of claim 7, wherein the block data table further stores, for each particular block, at least one of: a version number of the particular block, a generation time of the particular block, or a height value of the particular block.

9. The non-transitory, computer-readable medium of claim 7, wherein the identifier of the service data stored in the particular block comprises a hashed value of the service data.

10. The non-transitory, computer-readable medium of claim 7, wherein the operations further comprise, for each particular block of the plurality of blocks:

establishing a third mapping relationship between the determined identifier of the service data of the particular block and the determined identifier of the particular block with the service data after determining the identifier of the service data; and storing the third mapping relationship in a service data table, wherein the service data table stores an identifier of the service data and an identifier of the particular block associated with the service data, and at least one of: a version number of the service data, a service type of the service data, a digital signature in the service data, data content of the service data, or a storage status of the service data.

11. The non-transitory, computer-readable medium of claim 7, wherein the operations further comprise:

determining an identifier of a newly generated block when the new block is generated; and synchronously updating the relational database based on the determined identifier of the newly generated block.

12. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

identifying a particular block from a blockchain network, the blockchain network including a plurality of blocks;

determining an identifier of the particular block, wherein determining the identifier of the particular block comprises obtaining digest information of the particular block, computing, using a hash algorithm, a value based on the obtained digest information of the particular block, and associating the value computed based on the obtained digest information as the identifier of the particular block;

determining an identifier of service data stored in the particular block;

obtaining a state value of the particular block based on the service data stored in the particular block, wherein the state value comprises hash value obtained based on a Bucket tree;

establishing a first mapping relationship between the determined identifier of the particular block, the obtained state value of the particular block and, the determined identifier of the service data stored in the particular block;

establishing a second mapping relationship between the identifier of the particular block, the obtained state value of the particular block, and an identifier of a previous block to the particular block after the state value of the particular block is obtained;

updating a relational database based on the first mapping relationship and the second mapping relationship for the particular block, wherein updating the relational database comprises storing, in a block data table of the relational database, for each particular block, the determined identifier of the particular block, the obtained state value of the particular block, and the determined identifier of the service data stored in the particular block;

determining an identifier of newly generated service data when the new service data is generated;

establishing a new mapping relationship between the identifier of the newly generated service data and an identifier of a second particular block storing the new service data after the new service data is stored in the second particular block; and updating the relational database based on the new mapping relationship.

* * * * *